(12) United States Patent
Yagasaki

(10) Patent No.: US 8,857,382 B2
(45) Date of Patent: Oct. 14, 2014

(54) HYDRAULIC CONTROL APPARATUS FOR CONTINUOUSLY VARIABLE TRANSMISSION

(75) Inventor: Toru Yagasaki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/983,779

(22) PCT Filed: Feb. 17, 2012

(86) PCT No.: PCT/JP2012/053785
§ 371 (c)(1),
(2), (4) Date: Aug. 6, 2013

(87) PCT Pub. No.: WO2012/114997
PCT Pub. Date: Aug. 30, 2012

(65) Prior Publication Data
US 2013/0312675 A1    Nov. 28, 2013

(30) Foreign Application Priority Data
Feb. 24, 2011 (JP) ................. 2011-039015

(51) Int. Cl.
*F02B 63/00* (2006.01)
*F02B 61/06* (2006.01)
*F16H 61/662* (2006.01)
*F16H 61/00* (2006.01)

(52) U.S. Cl.
CPC .......... *F02B 61/06* (2013.01); *F16H 61/66272* (2013.01); *F16H 61/0025* (2013.01)
USPC .................. 123/2; 477/45; 474/28

(58) Field of Classification Search
CPC ..... F16H 63/06; F16H 63/062; F16H 63/065; F16H 61/0021; F16H 61/0025; F16H 61/0028; F16H 61/0206; F16H 2059/683; F16H 9/16; F16H 9/18; F15B 13/04; F15B 13/0401; F15B 13/0402

USPC ........... 123/2; 474/8, 18, 28; 477/45–50, 125, 477/126; 303/117.1; 475/127–133; 137/625.66
See application file for complete search history.

(56) References Cited

U.S. PATENT DOCUMENTS

| 4,466,521 A * | 8/1984 | Hattori et al. ................. 701/61 |
| 4,584,907 A * | 4/1986 | Niwa et al. ..................... 477/48 |
| 4,712,453 A * | 12/1987 | Haley .............................. 477/39 |
| 6,306,061 B1 * | 10/2001 | Inamura et al. ................. 477/45 |
| 2008/0026904 A1 | 1/2008 | Wagner |

FOREIGN PATENT DOCUMENTS

| JP | 11-247981 A | 9/1999 |
| JP | 2000-179664 A | 6/2000 |
| JP | 2005-114130 A | 4/2005 |
| JP | 2008-240894 A | 10/2008 |
| JP | 2009-127814 A | 6/2009 |
| JP | 2009-540228 A | 11/2009 |

OTHER PUBLICATIONS

Japanese Decision to Grant a Patent application No. JP2013-501000 dated Jan. 22, 2014.

* cited by examiner

*Primary Examiner* — Hung Q Nguyen
(74) *Attorney, Agent, or Firm* — Squire Patton Boggs (US) LLP

(57) ABSTRACT

In a hydraulic control apparatus for a continuously variable transmission that enables gear ratio variation by controlling supply of hydraulic oil to first and second hydraulic actuators, there are provided with first and second oil passages connecting the first and second actuators to a reservoir, a single electric hydraulic pump installed at a common portion thereof, first and second check valves installed in the first and second oil passages for blocking flow of hydraulic oil to the reservoir, first and second bypass passages formed in the first and second oil passages, a control valve installed therebetween, a fourth check valve installed in the first and second bypass passages for blocking flow of hydraulic oil to the hydraulic pump, and a controller for controlling these, thus readily enabling a configuration that reduces the number of electric hydraulic pumps to one and minimizes cost increase.

11 Claims, 8 Drawing Sheets

STEADY STATE

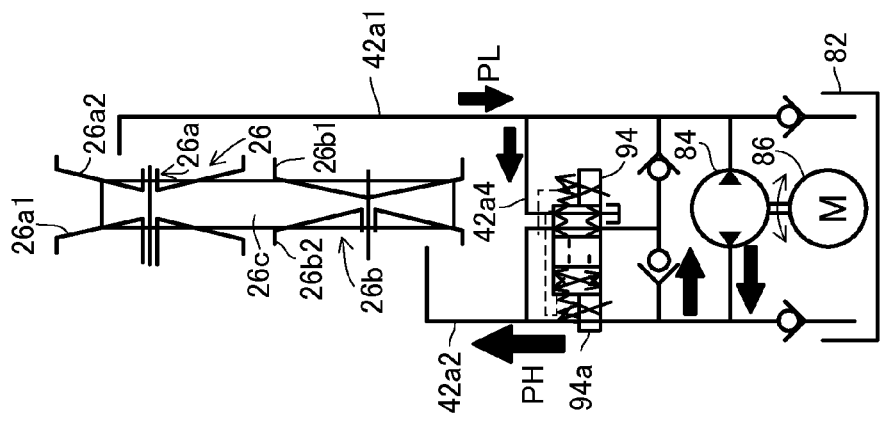
FIG.4C SHIFT TO OD SIDE
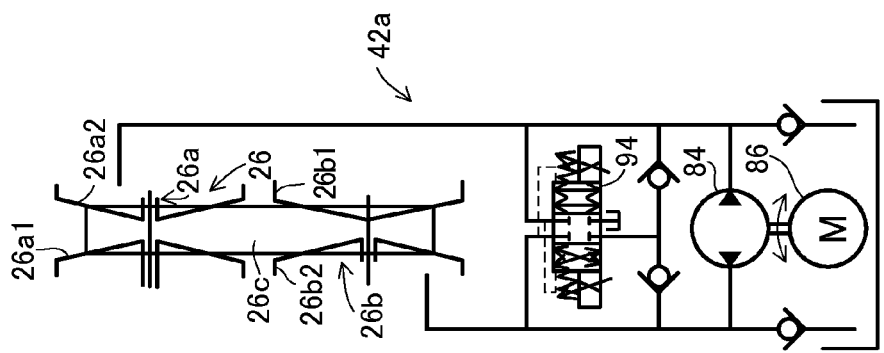
FIG.4B STEADY STATE
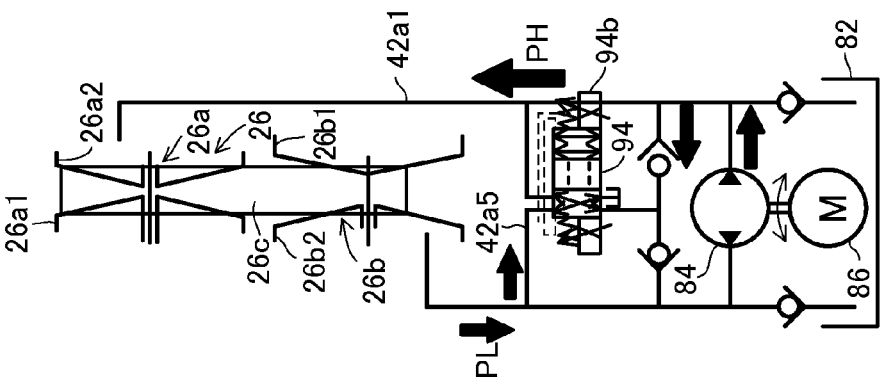
FIG.4A SHIFT TO LOW SIDE

FIX RATIO AT LOW (INCREASE LOW-PRESSURE PL)

FIX RATIO AT LOW (DECREASE LOW-PRESSURE PL)

FIX RATIO AT OD (INCREASE LOW-PRESSURE PL)

FIX RATIO AT OD (DECREASE LOW-PRESSURE PL)

STEADY STATE

42a8   42a7

SHIFT TO LOW SIDE
FIX RATIO AT LOW
(DECREASE LOW-PRESSURE PL)

FIX RATIO AT LOW
(INCREASE LOW-PRESSURE PL)

SHIFT TO OD
FIX RATIO AT OD
(DECREASE LOW-PRESSURE PL)

FIX RATIO AT OD
(INCREASE LOW-PRESSURE PL)

HYDRAULIC CONTROL APPARATUS FOR CONTINUOUSLY VARIABLE TRANSMISSION

TECHNICAL FIELD

This invention relates to a hydraulic control apparatus for a continuously variable transmission of a belt-drive.

BACKGROUND ART

As set out, for example, in Patent Document 1 indicated below, a hydraulic control apparatus for a continuously variable transmission equipped with a drive pulley connected to an engine mounted in a vehicle, a driven pulley connected to driven wheels and a belt wound around the pulleys is ordinarily operated by supplying hydraulic oil from a hydraulic pump driven by the engine to hydraulic actuators of the drive pulley and driven pulley.

Regarding the hydraulic pump driven by the engine, Patent Document 2 indicated below teaches a technique for establishing characteristics capable of ensuring the required hydraulic pressure under all conditions, which, with concern about low energy efficiency, installs two servo pumps driven by electric motors, and uses the state variable of a state variable model of a servo pump system whose input is a quantity of state having a linear relationship to the voltage input to servo amplifiers of the electric motors so as to perform state feedback control for regulating the hydraulic oil flow rate to the desired flow rate.

Further, in a similar servo pump system, Patent Document 3 indicated below teaches a technique of combining a feedback linearization unit linearized by an input/output feedback linearization with a plant whose input is the hydraulic oil flow rates to the hydraulic actuators and output is the resulting drive pulley and driven pulley pressures, wherein input to the feedback linearization unit is controlled based on deviation between the pressures output from the plant and the desired pressures.

PRIOR ART DOCUMENTS

Patent Documents

Patent Document 1: Japanese Laid-Open Patent Application No. 2005-114130
Patent Document 2: Japanese Laid-Open Patent Application No. 2008-240894
Patent Document 3: Japanese Laid-Open Patent Application No. 2009-127814

SUMMARY OF THE INVENTION

Problem to be Solved by the Invention

Although the techniques set out in Patent Documents 2 and 3 can by their aforesaid configurations overcome the problems of the technique of Patent Document 1 and improve energy efficiency, their structures are complicated and cost is increased owing to the need for two electric hydraulic pumps.

The object of this invention is therefore to overcome the aforesaid problem by providing a continuously variable belt-drive transmission with a hydraulic control apparatus for a continuously variable transmission, which is simplified in structure and minimized in cost increase by reducing the number of electric hydraulic pumps to one.

Means for Solving the Problem

In order to achieve the object, as recited in claim 1, this invention is configured to have an apparatus for controlling a continuously variable transmission having a drive pulley connected to a prime mover installed in a vehicle and movable in an axial direction when hydraulic oil is supplied to a first hydraulic actuator, a driven pulley connected to driven wheels and movable in an axial direction when hydraulic oil is supplied to a second hydraulic actuator, and a power transmissible element wound around the drive pulley and driven pulley and configured to vary a gear ratio continuously variable by controlling supply of hydraulic oil to the first and second actuators to vary the winding radius of the power transmissible element, comprising: a first oil passage that connects the first hydraulic actuator and a reservoir for retaining hydraulic oil; a second oil passage that connects the second hydraulic actuator and the reservoir; a single electric reversible hydraulic pump installed at a common portion of the first oil passage and the second oil passage and capable of pumping hydraulic oil retained in the reservoir and delivering to the first oil passage or the second oil passage; a first check valve installed in the first oil passage between the reservoir and the hydraulic pump for blocking flow of hydraulic oil from the hydraulic pump to the reservoir; a second check valve installed in the second oil passage between the reservoir and the hydraulic pump for blocking flow of hydraulic oil from the hydraulic pump to the reservoir; a first bypass passage formed in the first oil passage between the hydraulic pump and the first hydraulic actuator; a second bypass passage formed in the second oil passage between the hydraulic pump and the second hydraulic actuator; a control valve installed between the first bypass passage and the second bypass passage and capable of varying the flow passage and pressure of hydraulic oil flowing through the first bypass passage and the second bypass passage; a third check valve installed in the first bypass passage for blocking flow of hydraulic oil from the control valve to the hydraulic pump; a fourth check valve installed in the second bypass passage for blocking flow of hydraulic oil from the control valve to the hydraulic pump; and a controller for controlling operation of the hydraulic pump and the control valve.

As recited in claim 2, in the apparatus, the first bypass passage and the second bypass passage are configured to have a portion connecting the control valve and the third check valve and a portion connecting the control valve and the fourth check valve in common.

As recited in claim 3, in the apparatus, the controller drives the hydraulic pump to supply hydraulic oil from the first oil passage to the first hydraulic actuator, and controls operation of the control valve to connect the second bypass passage to the reservoir to discharge hydraulic oil from the second hydraulic actuator, when the gear ratio is to be changed to a smallest value side.

As recited in claim 4, in the apparatus, the controller drives the hydraulic pump at a predetermined rotational speed to supply hydraulic oil of a prescribed high-pressure from the first oil passage to the first hydraulic actuator, and controls the operation of the control valve to connect the second bypass passage to the reservoir to discharge hydraulic oil from the second hydraulic actuator in accordance with the desired gear ratio, when the gear ratio is to be changed to a smallest value side.

As recited in claim 5, in the apparatus, the controller drives the hydraulic pump to supply hydraulic oil from the first oil passage to the first hydraulic actuator to establishes a smallest gear ratio, and then controls the operation of the control valve to supply hydraulic oil from the first oil passage to the second hydraulic actuator through the third check valve, the second bypass passage and the second oil passage, when the gear ratio is to be fixed at the smallest value.

As recited in claim 6, in the apparatus, the controller drives the hydraulic pump to supply hydraulic oil from the second oil passage to the second hydraulic actuator, and controls the operation of the control valve to connect the first bypass passage to the reservoir to discharge hydraulic oil from the first hydraulic actuator, when the gear ratio is to be changed to the largest value side.

As recited in claim 7, in the apparatus, the controller drives the hydraulic pump at a predetermined rotational speed to supply hydraulic oil of a prescribed high pressure from the second oil passage to the second hydraulic actuator, and controls the operation of the control valve to connect the first bypass passage to the reservoir to discharge hydraulic oil from the first hydraulic actuator in accordance with the desired gear ratio, when the gear ratio is to be changed to the largest value side.

As recited in claim 8, in the apparatus, the controller drives the hydraulic pump to supply hydraulic oil from the second oil passage to the second hydraulic actuator to establishes a largest gear ratio, and then controls the operation of the control valve to supply hydraulic oil from the second oil passage to the first hydraulic actuator through the fourth check valve, the first bypass passage and the first oil passage, when the gear ratio is to be fixed at the largest value.

As recited in claim 9, in the apparatus, a closed circuit is constituted by the first oil passage connecting the first hydraulic actuator and the reservoir, the second oil passage connecting the second hydraulic actuator and the reservoir, and the hydraulic pump installed in the common portion of the first oil passage and the second oil passage.

Effects of the Invention

Since the hydraulic control apparatus of a continuously variable transmission recited in claim 1 is configured such that it comprises: first oil passage that connects the first hydraulic actuator and a reservoir for retaining hydraulic oil; a second oil passage that connects the second hydraulic actuator and the reservoir; a single electric reversible hydraulic pump installed at a common portion of the first oil passage and the second oil passage and capable of pumping hydraulic oil retained in the reservoir and delivering to the first oil passage or the second oil passage; a first check valve installed in the first oil passage between the reservoir and the hydraulic pump for blocking flow of hydraulic oil from the hydraulic pump to the reservoir; a second check valve installed in the second oil passage between the reservoir and the hydraulic pump for blocking flow of hydraulic oil from the hydraulic pump to the reservoir; a first bypass passage formed in the first oil passage between the hydraulic pump and the first hydraulic actuator; a second bypass passage formed in the second oil passage between the hydraulic pump and the second hydraulic actuator; a control valve installed between the first bypass passage and the second bypass passage and capable of varying the flow passage and pressure of hydraulic oil flowing through the first bypass passage and the second bypass passage; a third check valve installed in the first bypass passage for blocking flow of hydraulic oil from the control valve to the hydraulic pump; a fourth check valve installed in the second bypass passage for blocking flow of hydraulic oil from the control valve to the hydraulic pump; and a controller for controlling operation of the hydraulic pump and the control valve, it becomes possible to simplify the structure and minimize cost increase by reducing the number of electric hydraulic pumps to one.

Moreover, the adoption of a configuration that controls operation of the hydraulic pump by the controller makes it possible to hold the rate of operation of the hydraulic pump to the minimum necessary and thus conserve energy. Further, the configuration calls for the control valve provided for varying hydraulic oil flow direction and pressure to be installed in the common portion of the first and second bypass passages and for its operation to be controlled by the controller, so that the structure can be still further simplified because no additional switching valve is required on the drain side or elsewhere. Furthermore, the provision of the first to fourth check valves enables reliable hydraulic oil retention.

Since the hydraulic control apparatus of a continuously variable transmission recited in claim 2 is configured such that the first bypass passage and the second bypass passage are configured to have a portion connecting the control valve and the third check valve and a portion connecting the control valve and the fourth check valve in common, in addition to the effects mentioned above, it becomes possible to simplify the structure of the control valve and prevent oil passage increase, thus enabling further structural simplification.

Since the hydraulic control apparatus of a continuously variable transmission recited in claim 3 is configured such that the controller drives the hydraulic pump to supply hydraulic oil from the first oil passage to the first hydraulic actuator, and controls operation of the control valve to connect the second bypass passage to the reservoir to discharge hydraulic oil from the second hydraulic actuator, when the gear ratio is to be changed to a smallest value side, in addition to the effects mentioned above, it becomes possible to reliably change the gear ratio to the smallest value (OD) side merely by merely controlling the operation of the hydraulic pump and control valve.

Since the hydraulic control apparatus of a continuously variable transmission recited in claim 4 is configured such that the controller drives the hydraulic pump at a predetermined rotational speed to supply hydraulic oil of a prescribed high-pressure from the first oil passage to the first hydraulic actuator, and controls the operation of the control valve to connect the second bypass passage to the reservoir to discharge hydraulic oil from the second hydraulic actuator in accordance with the desired gear ratio, when the gear ratio is to be changed to a smallest value side, in addition to the effects mentioned above, it becomes possible to change the gear ratio reliably and easily. And as the hydraulic pump supplies hydraulic oil directly to the pulley on the side that increases the winding radius R of the belt, it possible to shorten the time needed for shifting, since the rotational speed (rotating speed) of the hydraulic pump is the predominant factor determining the time required for shifting.

Moreover, the structure enables pressure regulation of the pulley on the small winding radius R side opposite thereto by means of the control valve, which makes it possible to transmit the torque of the prime mover to the driven wheels without slipping.

Since the hydraulic control apparatus of a continuously variable transmission recited in claim 5 is configured such that the controller drives the hydraulic pump to supply hydraulic oil from the first oil passage to the first hydraulic actuator to establishes a smallest gear ratio, and then controls the operation of the control valve to supply hydraulic oil from the first oil passage to the second hydraulic actuator through the third check valve, the second bypass passage and the second oil passage, when the gear ratio is to be fixed at the smallest value, in addition to the effects mentioned above, it becomes possible to fix the gear ratio reliably at the smallest value (OD) merely by controlling the operation of the hydraulic pump and control valve. In other words, the pressure of the hydraulic oil supplied to the first actuator and the pressure of the hydraulic oil supplied to the second actuator can be simultaneously regulated using a single hydraulic pump, so that the gear ratio can be reliably fixed at the smallest value (OD) with a simple configuration even in the case where hydraulic oil has to be supplied to the second actuator side.

Since the hydraulic control apparatus of a continuously variable transmission recited in claim 6 is configured such that the controller drives the hydraulic pump to supply hydraulic oil from the second oil passage to the second hydraulic actuator, and controls the operation of the control valve to connect the first bypass passage to the reservoir to discharge hydraulic oil from the first hydraulic actuator, when the gear ratio is to be changed to the largest value side, in addition to the effects mentioned above, it becomes possible to reliably change the gear ratio to the largest value (LOW) side merely by controlling the operation of the hydraulic pump and control valve.

Since the hydraulic control apparatus of a continuously variable transmission recited in claim 7 is configured such that the controller drives the hydraulic pump at a predetermined rotational speed to supply hydraulic oil of a prescribed high pressure from the second oil passage to the second hydraulic actuator, and controls the operation of the control valve to connect the first bypass passage to the reservoir to discharge hydraulic oil from the first hydraulic actuator in accordance with the desired gear ratio, when the gear ratio is to be changed to the largest value side, in addition to the effects mentioned above, similar to the configuration recited in claim 4, it becomes possible to change the gear ratio reliably and easily, and as the hydraulic pump supplies hydraulic oil directly to the pulley on the side that increases the winding radius R of the belt, it possible to shorten the time needed for shifting, since the rotational speed (rotating speed) of the hydraulic pump is the predominant factor determining the time required for shifting.

Moreover, the structure enables pressure regulation of the pulley on the small winding radius R side opposite thereto by means of the control valve, which makes it possible to transmit the torque of the prime mover to the driven wheels without slipping.

Since the hydraulic control apparatus of a continuously variable transmission recited in claim 8 is configured such that the controller drives the hydraulic pump to supply hydraulic oil from the second oil passage to the second hydraulic actuator to establishes a largest gear ratio, and then controls the operation of the control valve to supply hydraulic oil from the second oil passage to the first hydraulic actuator through the fourth check valve, the first bypass passage and the first oil passage, when the gear ratio is to be fixed at the largest value, in addition to the effects mentioned above, it becomes possible to reliably fix the gear ratio at the largest value (LOW) merely by controlling the operation of the hydraulic pump 84 and control valve 94.

In other words, the pressure of the hydraulic oil supplied to the second actuator and the pressure of the hydraulic oil supplied to the first actuator can be simultaneously regulated using a single hydraulic pump 84, so that the gear ratio can be reliably fixed at the largest value (LOW) with a simple configuration even in the case where hydraulic oil has to be supplied to the first actuator side.

Since the hydraulic control apparatus of a continuously variable transmission recited in claim 9 is configured such that a closed circuit is constituted by the first oil passage connecting the first hydraulic actuator and the reservoir, the second oil passage connecting the second hydraulic actuator and the reservoir, and the hydraulic pump installed in the common portion of the first oil passage and the second oil passage, in addition to the effects mentioned above, it becomes possible to reliably keep the rate of operation of the hydraulic pump to the minimum necessary, thereby realizing still better energy conservation without affecting supply/discharge of hydraulic pressure to members other than the first and second hydraulic actuators, such as the torque converter and forward clutch.

BRIEF DESCRIPTION OF THE DRAWINGS

FIG. 4 is an explanatory diagram showing the case where the gear ratio in the continuously variable transmission shown in FIG. 1 is shifted from the steady state to the smallest ratio side (LOW) or the largest ratio side (OD).

MODES FOR CARRYING OUT THE INVENTION

Modes for implementing the hydraulic control apparatus for a continuously variable transmission according this invention are explained with reference to the attached drawings in the following.

First Embodiment

Figure 1:
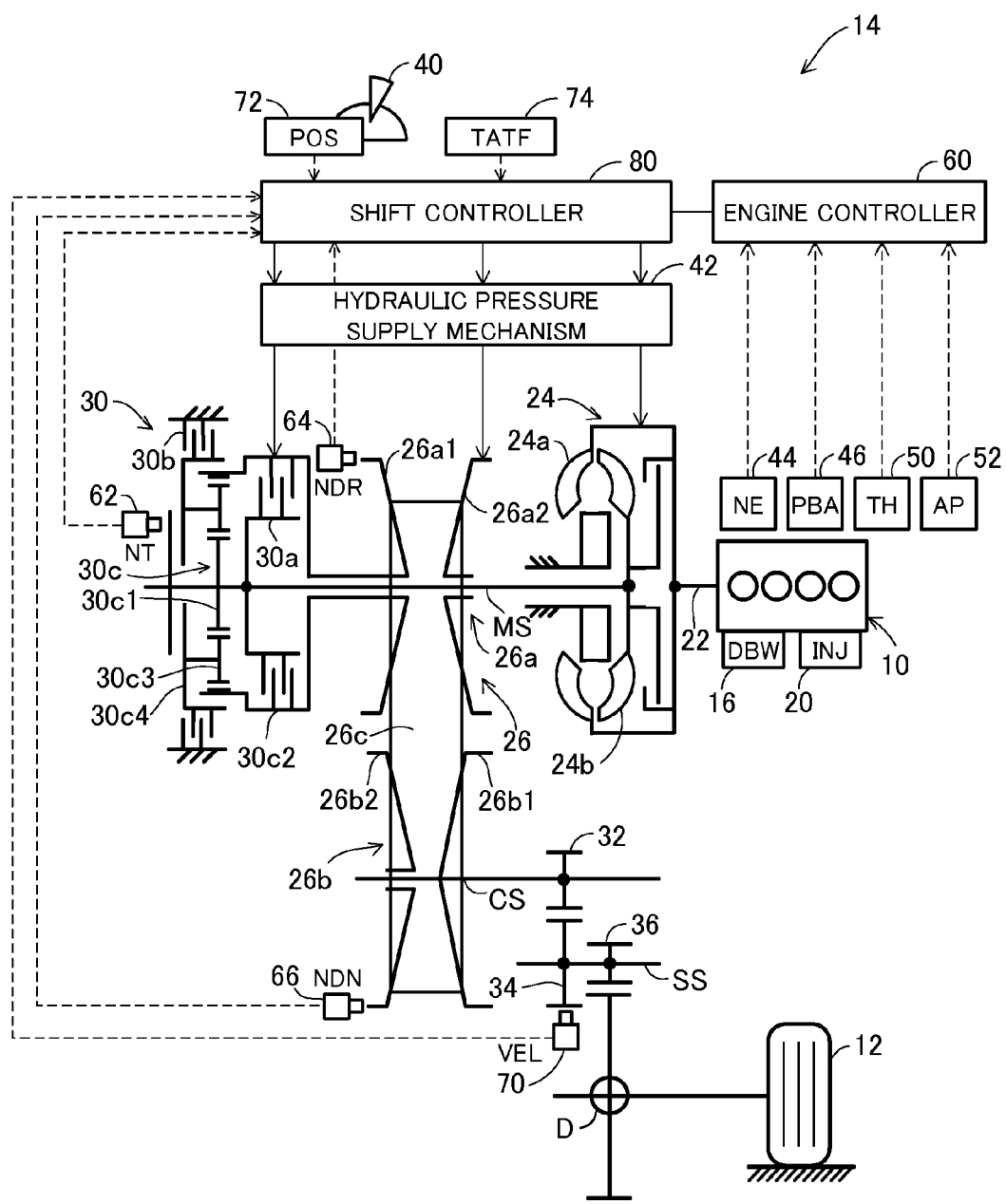
FIG. 1 is a schematic diagram showing an overall view of a hydraulic control apparatus for a continuously variable transmission according to a first embodiment of this invention.

FIG. 1 is a schematic diagram showing an overall view of a hydraulic control apparatus for a continuously variable transmission according to a first embodiment of this invention.

Symbol 10 in FIG. 1 designates an engine (internal combustion engine (prime mover)). The engine 10 is mounted in a vehicle 14 provided with driven wheels 12 among other equipment.

A throttle valve (not shown) installed in an air-intake system of the engine 10 is mechanically disconnected from an accelerator pedal (not shown) installed at a vehicle operator's seat and is connected to and driven by a DBW (Drive By Wire) mechanism 16 comprising an electric motor or other actuator.

Intake air metered by the throttle valve flows through an intake manifold (not shown) to be mixed with fuel injected from injectors (fuel injection valves) 20 located near intake ports of respective cylinders to form an air-fuel mixture that flows into the cylinder combustion chambers (not shown) when intake valves (not shown) open. In each combustion chamber, the fuel mixture is ignited and burns, thereby driving a piston (not shown) and rotating a crankshaft 22, whereafter it is discharged out of the engine 10 as exhaust.

The rotation of the crankshaft 22 of the engine 10 is inputted through a torque converter 24 to a Continuously Variable Transmission (CVT) 26. Specifically, the crankshaft 22 is connected through a drive plate of the torque converter 24 to a pump-impeller 24a, while a turbine-runner 24b installed opposite thereto to receive a fluid (hydraulic oil) is connected to a main shaft (input shaft) MS.

The CVT 26 comprises a drive pulley 26a fitted on the main shaft MS, a driven pulley 26b fitted on a countershaft (output shaft) CS which is parallel to the main shaft MS, and a metal belt (power transmissible element) 26c wound around the drive and driven pulleys.

A drive pulley 26a comprises a fixed pulley half 26a1 fitted on the main shaft MS to be incapable relative rotation and of axial direction movement and a movable pulley half (first hydraulic actuator) 26a2 equipped with a hydraulic cylinder chamber (not shown) and fitted on the main shaft MS to be incapable of relative rotation and capable of relative movement with respect to the fixed pulley half 26a1 in the axial direction.

The driven pulley 26b comprises a fixed pulley half 26b1 fitted on the countershaft CS to be incapable of relative rotation and of axial direction movement and a movable pulley half (second hydraulic actuator) 26b2 equipped with a hydraulic cylinder chamber (not shown) and fitted on the countershaft CS to be incapable of relative rotation and capable of relative movement with respect to the fixed pulley half 26b1 in the axial direction.

Thus, the CVT 26 is equipped with the drive pulley 26a slidable in the axial direction when hydraulic oil is supplied to the hydraulic cylinder chamber of the movable pulley half 26a2, the driven pulley 26b connected to the driven wheels 12 and slidable in the axial direction when hydraulic oil is supplied to the hydraulic cylinder chamber of the movable pulley half 26b2, and the belt 26c would around the drive pulley 26a and driven pulley 26b.

The belt 26c comprises multiple of V-surfaced elements supported by two sets of rings, and the driving force (torque) of the engine 10 is transmitted from the drive pulley 26a to the driven pulley 26b by pressing the element V-surfaces into contact with the pulley surfaces of the drive pulley 26a and driven pulley 26b on both sides.

The CVT 26 is connected to a forward-reverse switching unit 30. The forward-reverse switching unit 30 comprises a forward clutch 30a, a reverse brake-clutch 30b, and a planetary gear mechanism 30c located between the two clutches. The CVT 26 is connected to the engine 10 through the forward clutch 30a.

In the planetary gear mechanism 30c, a sun gear 30c1 is fixed on the main shaft MS and a ring gear 30c2 is fixed on the fixed pulley half 26a1 of the drive pulley 26a through the forward clutch 30a.

A pinion 30c3 is installed between the sun gear 30c1 and the ring gear 30c2. The pinion 30c3 is connected to the sun gear 30c1 by a carrier 30c4. When the reverse brake-clutch 30b is operated, the carrier 30c4 is fixed (locked) as a result.

The rotation of the countershaft CS is transmitted to a secondary shaft (intermediate shaft) SS through reduction gears 32, 34, and the rotation of the secondary shaft SS is transmitted to the left and right driven wheels (only the left wheel shown) 12 through a gear 36 and a differential D.

The operator switches between the forward clutch 30a and the reverse brake-clutch 30b by operating a shift lever 40 that is provided near the vehicle operator's seat and has, for example, P, R, N, D, S and L positions. When the operator selects one of the positions of the shift lever 40, the selection operation is transmitted to a manual valve of a hydraulic pressures supply mechanism 42 for the CVT 26 and the like.

For example, when the D, S or L position is selected, the spool of the manual valve moves in response so as to discharge hydraulic oil (hydraulic pressure) from a piston chamber of the reverse brake-clutch 30b, while on the other hand hydraulic pressure is supplied to a piston chamber of the forward clutch 30a, thereby engaging the forward clutch 30a.

When the forward clutch 30a is engaged, all gears rotate integrally with the main shaft MS, and the drive pulley 26a is driven in the same direction (forward direction) as the main shaft MS.

In contrast, when the R position is selected, hydraulic oil is discharged from the piston chamber of the forward clutch 30a, while on the other hand hydraulic pressure is supplied to the piston chamber of the reverse brake-clutch 30b, so that the reverse brake-clutch 30b operates. As a result, the carrier 30c4 is fixed, the ring gear 30c2 is driven in the opposite direction from the sun gear 30c1, and the drive pulley 26a is driven in the opposite direction (reverse direction) from the main shaft MS.

Further, when the P or N position is selected, hydraulic oil is discharged from both piston chambers so that the forward clutch 30a and reverse brake-clutch 30b are both disengaged to cut off power transmission through the forward-reverse switching unit 30 and stop power transmission between the engine 10 and the drive pulley 26a of the CVT 26.

A crank angle sensor 44 is provided at a suitable location, such as near a cam shaft (not shown) of the engine 10, and outputs a signal indicating engine speed NE once every predetermined piston crank angle position. An absolute pressure sensor 46 is provided in the air-intake system at a suitable position downstream of the throttle valve and outputs a signal proportional to the absolute pressure PBA inside the air-intake pipe (indicative of engine load).

A throttle opening sensor 50 is provided at the actuator of the DBW mechanism 16 utilizes the amount of actuator rotation and outputs a signal proportional to the throttle valve opening TH, and an accelerator pedal depression sensor 52 is provided near the accelerator pedal and outputs a signal proportional to the accelerator pedal depression AP corresponding to the amount of accelerator pedal operation by the operator.

The outputs of the crank angle sensor 44 and other sensors are sent to an engine controller 60. The engine controller 60, which is equipped with a microcomputer, controls the operation of the DBW mechanism 16 in accordance with a desired throttle opening determined thereby based on the sensor outputs and determines a fuel injection quantity determined to drive the injectors 20 in accordance with the determined fuel injection quantity.

An NT sensor (rotational speed sensor) 62 is provided on the main shaft MS and outputs a pulse signal indicating the rotational speed of the turbine-runner 24b, specifically the rotational speed of the main shaft MS, more specifically the input rotational speed of the forward clutch 30a.

An NDR sensor (rotational speed sensor) 64 is provided at a suitable location near the drive pulley 26a of the CVT 26 and outputs a pulse signal in accordance with the rotational speed of the drive pulley 26a, i.e., the output rotational speed of the forward clutch 30a, and an NDN sensor 66 (rotational speed sensor) is provided at an appropriate position near the driven pulley 26b and outputs a pulse signal indicating the rotational speed of the driven pulley 26b.

A VEL sensor (rotational speed sensor) 70 is provided near the gear 36 of the secondary shaft SS utilizes the rotational speed of the gear 36 and outputs a pulse signal indicating the rotational speed of the output shaft of the CVT 26 or the vehicle speed V. A shift lever position sensor 72 is provided near the shift lever 40 and outputs a POS signal in accordance with the R, N, D or other position selected by the operator.

An oil temperature sensor 74 is provided at a suitable location in the hydraulic pressures supply mechanism 42 and outputs a signal indicating the oil temperature (hydraulic oil ATF temperature) TATF.

The outputs of the NT sensor 62 and other sensors mentioned above are sent to a shift controller 80 along with the outputs of other sensors not shown in the drawings. The shift controller 80 is also equipped with a microcomputer and is configured to communicate with the engine controller 60.

Based on the detected values, the shift controller 80 controls the operations of the forward-reverse switching unit 30, torque converter 24 and CVT 26 by energizing/de-energizing electromagnetic solenoids in the hydraulic pressure supply mechanism 42.

Figure 2:
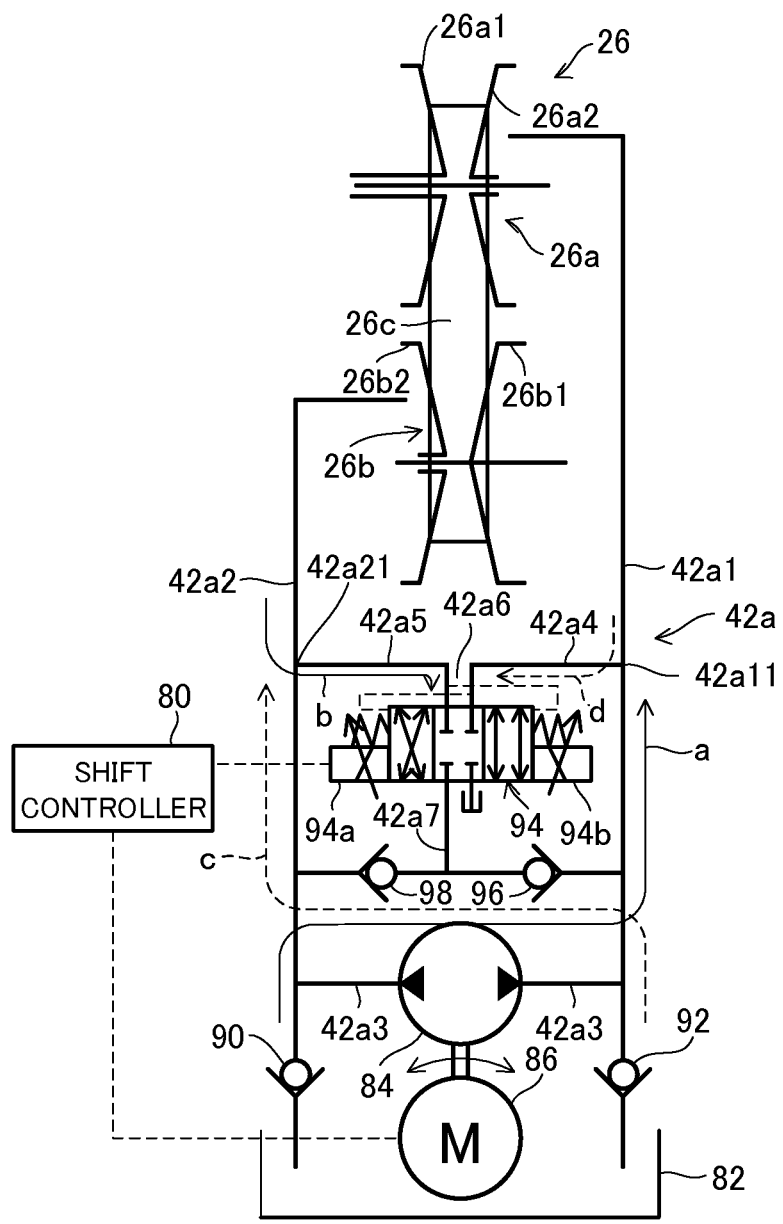
FIG. 2 is a hydraulic circuit diagram showing the configuration of a CVT hydraulic pressure supply mechanism included in a hydraulic pressures supply mechanism shown in FIG. 1.

FIG. 2 is a hydraulic circuit diagram schematically illustrating the configuration of a CVT hydraulic pressure supply mechanism 42a in the hydraulic pressures supply mechanism 42. As illustrated, the CVT hydraulic pressure supply mechanism 42a is configured as a closed circuit whose sole function is to supply hydraulic pressure to the CVT 26.

More specifically, the supply of hydraulic oil to the torque converter 24 and forward-reverse switching unit 30 is performed in another mechanism of the hydraulic pressures supply mechanism 42 not shown in the drawings by energizing/de-energizing multiple electromagnetic control valves in response to the position of the manual valve. However, explanation of this operation is omitted here because it has no direct relation to the gist of this invention.

As illustrated, the CVT hydraulic pressure supply mechanism 42a comprises a first oil passage 42a1 that connects the movable pulley half (first hydraulic actuator) 26a2 of the drive pulley 26a and a reservoir 82 for retaining hydraulic oil, a second oil passage 42a2 that connects the movable pulley half (second hydraulic actuator) 26b2 of the driven pulley 26b and the reservoir 82, and a single hydraulic pump 84 installed at a common portion (oil passage) of the first oil passage 42a1 and second oil passage 42a2 so as to enable pumping and delivery of hydraulic oil stored in the reservoir 82 to the first oil passage 42a1 or the second oil passage 42a2.

The hydraulic pump 84 is connected to a motor (electric motor) 86 and comprises a reversible electric pump driven by the motor 86 to be capable of rotating in both a predetermined direction and the opposite direction. Thus, the hydraulic pump 84 is configured as an electric hydraulic pump not driven by the engine 10 but whose operation is controlled by controlling the operation of the motor 86.

The CVT hydraulic pressure supply mechanism 42a is further equipped a first check valve 90 installed in the first oil passage 42a1 between the reservoir 82 and hydraulic pump 84 for blocking flow of hydraulic oil from the hydraulic pump 84 to the reservoir 82, a second check valve 92 installed in the second oil passage 42a2 between the reservoir 82 and hydraulic pump 84 for blocking flow of hydraulic oil from the hydraulic pump 84 to the reservoir 82, a first bypass passage 42a4 formed in the first oil passage 42a1 between the hydraulic pump 84 and the movable pulley half 26a2, a second bypass passage 42a5 formed in the second oil passage 42a2 between the hydraulic pump 84 and the movable pulley half 26b2, a control valve 94 installed at 42a6 between the first bypass passage 42a4 and second bypass passage 42a5, a third check valve 96 installed in the first bypass passage 42a4 for blocking flow of hydraulic oil from the control valve 94 to the hydraulic pump 84, and a fourth check valve 98 installed in the second bypass passage 42a5 for blocking flow of hydraulic oil from the control valve 94 to the hydraulic pump 84.

As illustrated, the control valve 94 comprises a 4-port, 3-position switching valve that is equipped at opposite ends with electromagnetic solenoids 94a, 94b. The electromagnetic solenoids 94a, 94b are, for example, configured to attract when energized and move spools to the left and right in FIG. 2, thereby making it possible to change the flow direction and pressure of hydraulic oil passing through the first bypass passage 42a4 and second bypass passage 42a5.

The hydraulic pump 84, more specifically the motor 86 (its drive circuit) that drives the hydraulic pump 84, and the control valve 94 (its electromagnetic solenoids 94a, 94b) are connected to the shift controller (controller) 80.

Based on the sensor outputs of the shift position sensor 72 and other sensors and data acquired from the engine controller 60, the shift controller 80 controls the operation of the hydraulic pump 84 (by means of the motor 86 to be more exact) and the control valve 94. Therefore, the shift controller 80 can achieve the required gear ratio (transmission ratio) by operating through the motor 86 to increase/decrease the rotational speed of the hydraulic pump 84 and control the pressure of hydraulic oil supplied from the hydraulic pump 84. Note that representation of the shift controller 80 is omitted in FIG. 4 and later numbered drawings.

To elaborate on the description of the bypass passages, the control valve 94 is constituted as a 4-port, 3-position switching valve and, as illustrated, the first bypass passage 42a4 and second bypass passage 42a5 are configured so that the portion (oil passage) connecting the control valve 94 and the third check valve 96 and the portion connecting the control valve 94 and the fourth check valve 98 are constituted in common (as oil passage 42a7).

Now explaining the case where hydraulic pressure is supplied to the pulley 26a in order to shift to the OD side (side where the gear ratio is lowest), the shift controller 80 rotates the motor 86, in the forward direction, for example, to rotate the hydraulic pump 84 in the corresponding direction, thereby pumping hydraulic oil from the reservoir 82 and, as indicated by arrow a, delivering hydraulic oil of predetermined high-pressure PH to the first oil passage 42a1 and supplying it from the first oil passage 42a1 to the drive pulley 26a (its movable pulley half 26a2).

Simultaneously, the shift controller 80 energizes the electromagnetic solenoid 94b of the control valve 94, thereby moving the spool to the right in FIG. 2 and, as indicated by arrow b, and discharging (draining) hydraulic oil from the driven pulley 26b (its movable pulley half 26b2) through the second oil passage 42a2 and second bypass passage 42a5 into the reservoir 82.

Then explaining the case where hydraulic pressure is supplied to the pulley 26a in order to shift oppositely to the LOW side (side where the gear ratio is highest), the shift controller 80 rotates the motor 86, in the opposite direction to rotate the hydraulic pump 84 in the opposite direction and, as indicated by arrow c, supplying hydraulic oil of the aforesaid predetermined high-pressure PH through the second oil passage 42a2 to the drive pulley 26b (its movable pulley half 26b2).

Simultaneously, the shift controller 80 energizes the electromagnetic solenoid 94a of the control valve 94, thereby moving the spool to the left in FIG. 2 and, as indicated by arrow d, discharging (draining) hydraulic oil from the driven pulley 26a (its movable pulley half 26a2) through the first oil passage 42a1 and first oil passage 42a4 and first bypass passage 42a4 into the reservoir 82.

The CVT 26 is configured to enable the gear ratio to be continuously varied between the highest value (LOW) and the lowest value (OD) by controlling the supply of hydraulic oil to the drive pulley 26a (its movable pulley half 26a2) and the driven pulley 26b (its movable pulley half 26b2) so as to vary the winding radius R of the belt 26c.

Figure 3:
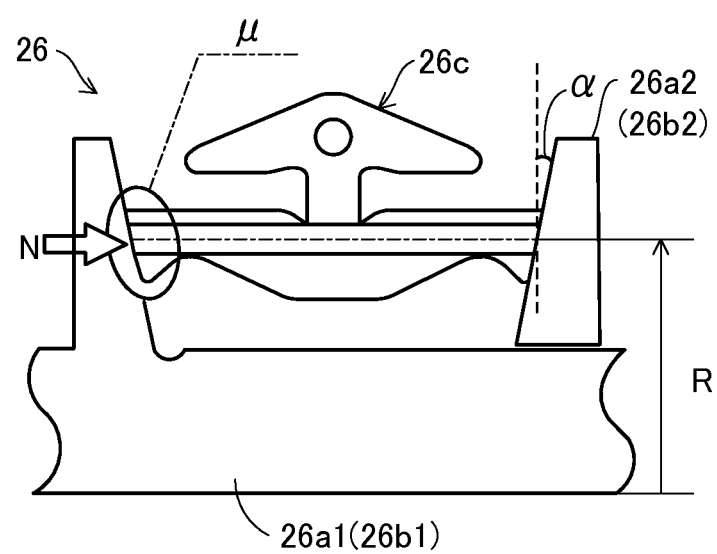
FIG. 3 is an explanatory view showing parameters used to calculate the transmitted torque of the belt of the continuously variable transmission shown in FIG. 1.

The transmitted torque of the belt 26c of the CVT 26 is expressed by the following equation (parameters in the equation are indicated in FIG. 3)

$$T = \mu \times N \times 2 \times R / \cos \alpha$$

In the foregoing, μ: coefficient of friction between belt 26c and pulleys 26a, 26b; α: V-surface angle; N: drag forced on by pulley thrust (=pulley thrust (pressure)×piston pressure-receiving area).

The winding radius R is determined by the gear ratio, and the ratio is determined from, inter alia, the vehicle speed V, throttle opening TH and the desired engine speed NE.

As is clear from the equation above, the transmitted torque T is in general determined by the winding radius R and reaction N of the belt 26c, and the winding radius R of the belt 26c is determined by the reaction N (more exactly by the pulley thrust), so that it is important for transmitting the engine torque efficiently without slipping to control the pulley thrust of the one of the drive pulley 26a and driven pulley 26b that is on the side of small diameter with smaller R.

Then at the time of shifting, efficient shifting can be achieved by supplying hydraulic oil (hydraulic pressure) to the drive pulley 26a or driven pulley 26b on the side that increases R, while maintaining the clamping force (pulley thrust) of the belt 26c.

Next, the operation of the shift controller 80 explained broadly in the foregoing will be explained in detail for the individual shifts.

FIG. 4 is an explanatory diagram showing the case of shifting from the steady state prior to shifting to the largest ratio side (LOW) or the smallest ratio side (OD). FIG. 4 and ensuing figures indicate the direction of high-pressure PH and low-pressure PL hydraulic oil flow with arrows and indicate the flow rate thereof (i.e., amount of hydraulic pressure) by the size of the arrows.

The steady state shown in FIG. 4B will be explained first. In the steady state, the pressure of the hydraulic oil supplied to the movable pulley halves 26a2, 26b2 is held constant, so that the shift controller 80 stops the rotation of the hydraulic pump 84 and puts the control valve 94 in the neutral position.

Since the CVT hydraulic pressure supply mechanism 42a is configured to be the closed circuit, the flow of hydraulic oil is stopped and the illustrated state maintained. As the operation of the hydraulic pump 84 and control valve 94 is stopped, unnecessary loss of energy is avoided.

The case shown in FIG. 4A of shifting to the largest ratio (LOW) side will be explained next. On the one hand, the shift controller 80 rotates the motor 86 at a predetermined rotational speed, in the direction opposite to the forward direction, for example, to drive the hydraulic pump 84 and thereby pump hydraulic oil from the reservoir 82 and supply it from the second oil passage 42a2 to the driven pulley 26b (its movable pulley half 26b2), while on the other it controls the operation of the control valve 94 so as to connect the first bypass passage 42a4 to the reservoir 82 and thereby discharge hydraulic oil from the drive pulley 26a (its movable pulley half 26a2).

More specifically, the shift controller 80 drives the hydraulic pump 84 at a predetermined rotational speed to regulate the pressure (hydraulic pressure) of the hydraulic oil supplied through the hydraulic pump 84 (from the second oil passage 42a2) to the predetermined high-pressure PH and, by PWM control or the like of the electromagnetic solenoid 94a of the control valve 94, moves the spool leftward in the drawing to discharge (drain) hydraulic oil from the drive pulley 26a, through the first bypass passage 42a4 and into the reservoir 82, thereby establishing an arbitrary required ratio.

After the desired ratio has once been established, the fuel economy of the engine 10 can be improved because energy loss can be avoided by putting the control valve 94 in the neutral position to halt rotation of the hydraulic pump 84, more exactly the motor 86 that drives it. At this time, the shift controller 80 maintains the torque for retaining the pressure difference between the high-pressure PH and low-pressure PL in the state where the desired ratio is established.

The case shown in FIG. 4C of shifting to the smallest ratio (OD) side will be explained next. On the one hand, the shift controller 80 rotates the motor 86, in the forward direction, for example, to drive the hydraulic pump 84 in the direction opposite to that in FIG. 4A and thereby pump hydraulic oil from the reservoir 82 and supply it from the first oil passage 42a1 to the drive pulley 26a (its movable pulley half 26a2) at the aforesaid predetermined high-pressure PH, while on the other hand it controls the operation of the control valve 94 so as to connect the second bypass passage 42a5 to the reservoir 82 and thereby discharge hydraulic oil from the driven pulley 26b (its movable pulley half 26b2).

More specifically, the shift controller 80 drives the hydraulic pump 84 at a predetermined rotational speed in the direction opposite to that in FIG. 4A to regulate the pressure (hydraulic pressure) of the hydraulic oil supplied through the hydraulic pump 84 (from the first oil passage 42a1) to the predetermined high-pressure PH.

Simultaneously, by performing PWM control or the like of the amount of current applied to the electromagnetic solenoid 94b of the control valve 94, the shift controller 80 moves the spool rightward in the drawing to control the pressure (hydraulic pressure) of the hydraulic oil discharged (drained) from the driven pulley 26b, through the second bypass passage 42a5 and into the reservoir 82 to the low-pressure PL, thereby establishing an arbitrary required ratio.

The case of fixing the ratio at LOW (largest value) will next be explained with reference to FIG. 5A, 5B.

When the ratio is fixed at LOW, under some driving conditions, such as at drive-off from a stopped condition, a case may arise that requires the torque of the engine 10 to be increased. At such time, hydraulic oil has to be supplied to not only the drive pulley 26a but also the driven pulley 26b, but in a configuration not provided with the third and fourth check valves 96, 98, hydraulic oil supplied to the driven pulley 26b is drained into the reservoir 82, making it impossible to maintain the maximum ratio.

However, this inconvenience is prevented in this embodiment owing to the provision of the third and fourth check valves 96, 98. In addition, control of the control valve 94 (its electromagnetic solenoid 94b) enables supply of hydraulic oil to the drive pulley 26a from the control valve 94 and first bypass passage 42a4.

Further, although hydraulic oil could conceivably be supplied to the drive pulley 26a by reversing the rotational direction of the hydraulic pump 84, this would result in undesirable leakage at the time of switching the rotational direction of the hydraulic pump 84.

In such case, moreover, it would become impossible to supply pressure to the driven pulley 26b, so that reliable maintenance of the maximum ratio would not be achievable. In this embodiment, however, the provision of the control valve 94 does away with the switching of the rotational direction of the hydraulic pump 84, so that hydraulic oil can be supplied to the drive pulley 26a with the ratio reliably fixed at LOW.

In other words, the hydraulic oil supplied to the driven pulley 26b and the hydraulic oil supplied to the drive pulley 26a can be regulated by using the single hydraulic pump 84, i.e., without using multiple hydraulic pumps, so that the ratio can be reliably fixed at the largest value (LOW) with a simple configuration.

Figure 5A:
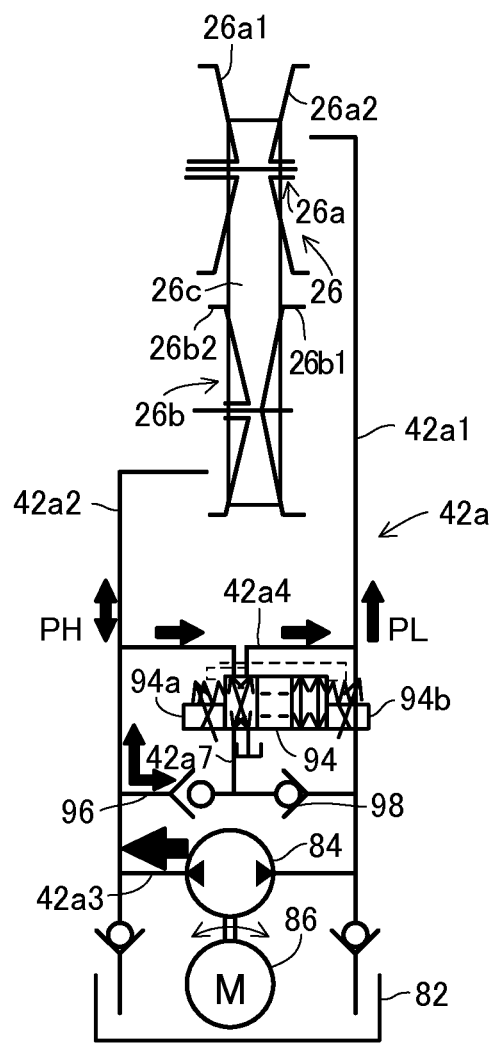
FIG. 5 explains the case where the ratio in the continuously variable transmission shown in FIG. 1 is fixed at LOW.

To explain with reference to FIG. 5A, in order to fix the ratio at LOW, the shift controller 80 operates the motor 86 to drive the hydraulic pump 84 and establish the largest value of the ratio (LOW) by supplying hydraulic oil from the second oil passage 42a2 to the driven pulley 26b (its movable pulley half 26b2), whereafter it controls the operation of the control valve 94 by performing PWM control or the like of the amount of current applied to the electromagnetic solenoid 94b of the control valve 94 so as to move the spool rightward in the drawing, thereby supplying hydraulic oil from the oil passage 42a3, through the fourth check valve 98 and to the drive pulley 26a (its movable pulley half 26a2) through the oil passage 42a7, first bypass passage 42a4 and first oil passage 42a1.

In other words, on the one hand, the shift controller 80 first drives the hydraulic pump 84 at a predetermined rotational speed for making the pressure of hydraulic oil supplied from the second oil passage 42a2 to the driven pulley 26b (its movable pulley half 26b2) the predetermined high-pressure PH for establishing the maximum ratio, while on the other hand it energizes the electromagnetic solenoid 94b of the control valve 94 to establish the maximum ratio (LOW) while discharging (draining) hydraulic oil of the drive pulley 26a (its movable pulley half 26a2) from the first bypass passage 42a4 into the reservoir 82.

At this time, in the case of increasing the torque of the engine 10, i.e., when hydraulic oil needs to be supplied also to the drive pulley 26a, the rotational speed of the hydraulic pump 84 is first increased to increase the pressure of hydraulic oil supplied from the hydraulic pump 84, and the amount of current applied to the electromagnetic solenoid 94b of the control valve 94 is subjected to PWM control or the like to move the spool rightward in the drawing, thereby supplying hydraulic oil to not only the driven pulley 26b (its movable pulley half 26b2) but also the drive pulley 26a (its movable pulley half 26a1). As a result, it becomes possible to supply hydraulic oil to the drive pulley 26a in an amount proportional to the amount of current applied to the electromagnetic solenoid 94a of the control valve 94, while maintaining LOW (maximum ratio).

Figure 5B:
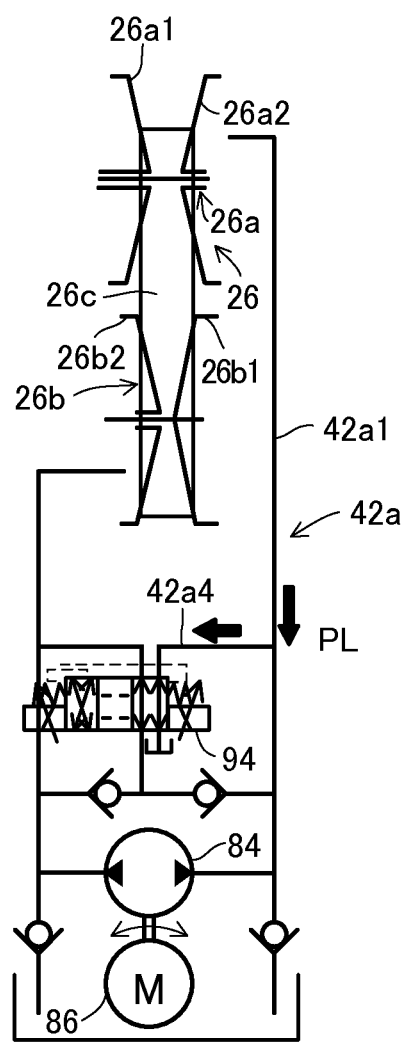

Further, as shown in FIG. 5B, when the pressure of hydraulic oil supplied to the drive pulley 26a needs to be reduced from the foregoing condition to a required pressure, it suffices to stop the hydraulic pump 84 and control the amount of current applied to the electromagnetic solenoid 94a of the control valve 94 so as to move the spool leftward in the drawing and thus regulate the amount of hydraulic oil drained from the first oil passage 42a1 and first bypass passage 42a4.

The case of fixing the ratio at OD (smallest value) will next be explained with reference to FIG. 6A, 6B.

When the ratio is fixed at OD, a case may arise under some driving conditions that, for example, requires the throttle valve to be fully opened, then fully closed, and fully opened again. At such time, hydraulic oil has to be supplied to not only the drive pulley 26a but also the driven pulley 26b, but in a configuration not provided with the third and fourth check valves 96, 98, hydraulic oil supplied to the driven pulley 26b is drained into the reservoir 82, making it impossible to maintain OD.

However, this inconvenience is prevented in this embodiment owing to the provision of the third and fourth check valves 96, 98. In addition, control of the control valve 94 (its electromagnetic solenoid 94a) enables supply of hydraulic oil to the driven pulley 26b from the control valve 94 and second bypass passage 42a5.

Figure 6A:
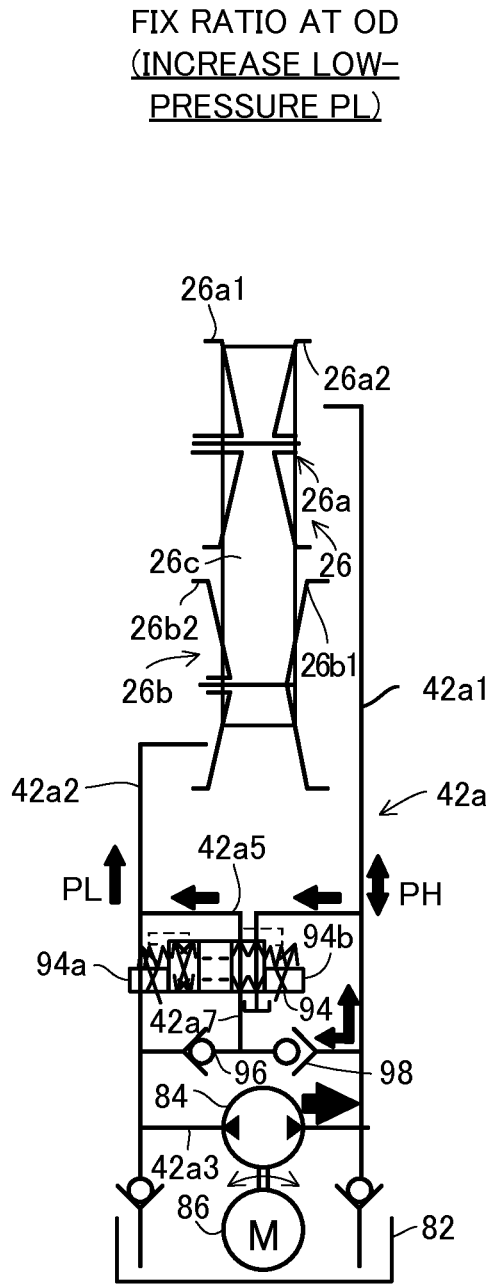
FIG. 6 explains the case where the ratio in the continuously variable transmission shown in FIG. 1 is fixed at OD.

To explain with reference to FIG. 6A, in order to fix the ratio at OD, the shift controller 80 drives the hydraulic pump 84 and establishes OD (maximum ratio) by supplying hydraulic oil from the first oil passage 42a1 to the drive pulley 26a (its movable pulley half 26a2), whereafter it controls the operation of the control valve 94 by performing PWM control or the like of the amount of current applied to the electromagnetic solenoid 94a of the control valve 94 so as to move the spool leftward in the drawing, thereby supplying hydraulic oil from the oil passage 42a3, through the third check valve 96 and to the driven pulley 26b (its movable pulley half 26b2) through the oil passage 42a7, second bypass passage 42a5 and second oil passage 42a2.

In other words, on the one hand, the shift controller 80 first drives the hydraulic pump 84 at a predetermined rotational speed for making the pressure of hydraulic oil supplied from the first oil passage 42a1 to the drive pulley 26a (its movable pulley half 26a2) the predetermined high-pressure PH for establishing the maximum ratio, while on the other hand it energizes the electromagnetic solenoid 94a of the control valve 94 to establish the maximum ratio (LOW) while discharging (draining) hydraulic oil of the driven pulley 26 (its movable pulley half 26a2) from the second bypass passage 42a5 into the reservoir 82.

At this time, when also supplying hydraulic oil to the driven pulley 26b, the rotational speed of the hydraulic pump 84 is increased to increase the pressure of hydraulic oil supplied from the hydraulic pump 84, and the amount of current applied to the electromagnetic solenoid 94a of the control valve 94 is subjected to PWM control or the like to move the spool leftward in the drawing, thereby supplying hydraulic oil to not only the drive pulley 26a (its movable pulley half 26a1) but also the driven pulley 26b (its movable pulley half 26b2). The amount (pressure) of hydraulic oil supplied to the driven pulley 26b is performed by regulating the amount of current applied to the electromagnetic solenoid 94a of the control valve 94.

As a result, it is possible to supply hydraulic oil to the driven pulley 26b in an amount proportional to the amount of current applied to the electromagnetic solenoid 94a of the control valve 94, while maintaining OD (maximum ratio).

Figure 6B:
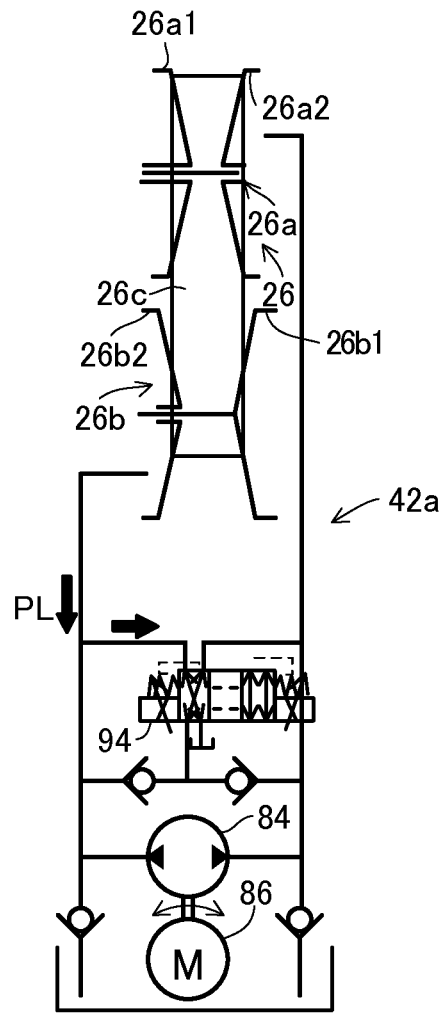
Figure 7A:
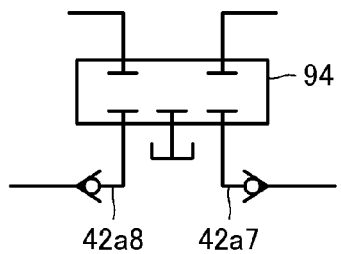
FIG. 7 is an explanatory diagram schematically illustrating another example of the configuration of a control valve shown in FIG 2.
Figure 7B:
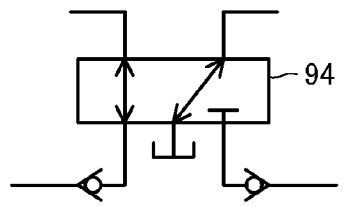
Figure 7C:
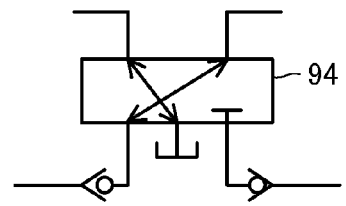
Figure 7D:
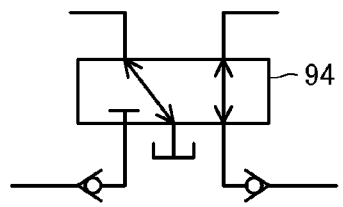
Figure 7E:
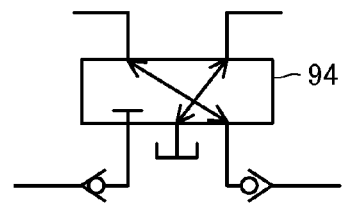

Further, as shown in FIG. 6B, when the pressure of hydraulic oil supplied to the driven pulley 26b needs to be reduced from the foregoing condition to a required pressure, it suffices to stop the hydraulic pump 84 and control the amount of current applied to the electromagnetic solenoid 94b of the control valve 94 so as to move the spool rightward in the drawing and thus regulate the amount of hydraulic oil drained from the second oil passage 42a2 and second bypass passage 42a5.

As set out in the foregoing, the hydraulic pressure supply control apparatus for a CVT according to this embodiment is configured to control the gear ratio of the CVT 26 by means of hydraulic oil (its pressure) supplied to the drive pulley 26a (its movable pulley half 26a2) and the driven pulley 26b (its movable pulley half 26*b*2) and to control hydraulic oil supplied to the drive pulley 26*a* and driven pulley 26*b* by means of the hydraulic pump 84 driven by the single motor 86.

In addition, it is configured to comprise the control valve 94 used to control the clamping pressure produced by the drive pulley 26*a* and driven pulley 26*b* (their movable pulley halves 26*a*2, 26*b*2), to have the control valve 94 installed on the downstream side of the hydraulic pump 84 (more exactly, on the side of the drive pulley 26*a* and driven pulley 26*b* (their movable pulley halves 26*a*2, 26*b*2)), and to have the check valves 96, 98 for blocking return of hydraulic oil from the drive pulley 26*a* and driven pulley 26*b* (their movable pulley halves 26*a*2, 26*b*2) provided on the upstream side of the control valve 94 (more exactly, between the control valve 94 and hydraulic pump 84).

As a result, the hydraulic pump 84 supplies hydraulic oil directly to the pulley 26*a* (or 26*b*) on the side that increases the winding radius R of the belt 26*c*, thus making the rotational speed (rotating speed) of the hydraulic pump 84 the predominant factor determining the time required for shifting and making it possible to shorten the time needed for shifting.

Moreover, efficient shifting is enabled because hydraulic oil (hydraulic pressure) is supplied to the pulley 26*a* or 26*b* on the side that increases the winding radius R of the belt 26*c* with the clamping force of the belt 26*c* maintained during shifting.

Further, the configuration enables pressure regulation of the drive pulley 26*a* (or 26*b*) on the small winding radius R side opposite thereto by operating the control valve 94 to reduce the pressure of the hydraulic oil of high-pressure PH, which makes it possible to change the ratio reliably and easily and to transmit the engine torque to the driven wheels 12 without slipping.

In addition, the single hydraulic pump 84 is driven by the single motor 86, and the CVT hydraulic pressure supply mechanism 42*a* is configured as a closed circuit, whereby cost increase can be minimized, the fuel efficiency of the engine 10 can be enhanced, and energy efficiency can be increased.

In the aforesaid description the control valve 94 is constituted as a 4-port, 3-position switching valve, and the first bypass passage 42*a*4 and second bypass passage 42*a*5 are configured to have the portion (oil passage) 42*a*7 connecting the control valve 94 and third check valve 96 and the portion 42*a*7 connecting the control valve 94 and fourth check valve 98 in common, but it should be noted that these are not a limitations.

For example, as schematically illustrated in FIG. 7A to FIG. 7E, the configuration can be such that the control valve 94 is constituted as a 4-port, 5-position switching valve, and the first bypass passage 42*a*4 and the second bypass passage 42*a*5 are constituted so that the portion (oil passage) 42*a*7 connecting the control valve 94 and third check valve 96 and the oil passage (here designated "42*a*8") connecting the control valve 94 and fourth check valve 98 are constituted separately.

Further, in the foregoing description, a configuration was explained wherein a spool is attracted when current passes through an electromagnetic solenoid of the control valve 94, but it is also possible to adopt a configuration in which a plunger is adopted and the spool is thrust outward upon current passage.

Second Embodiment

Figure 8:
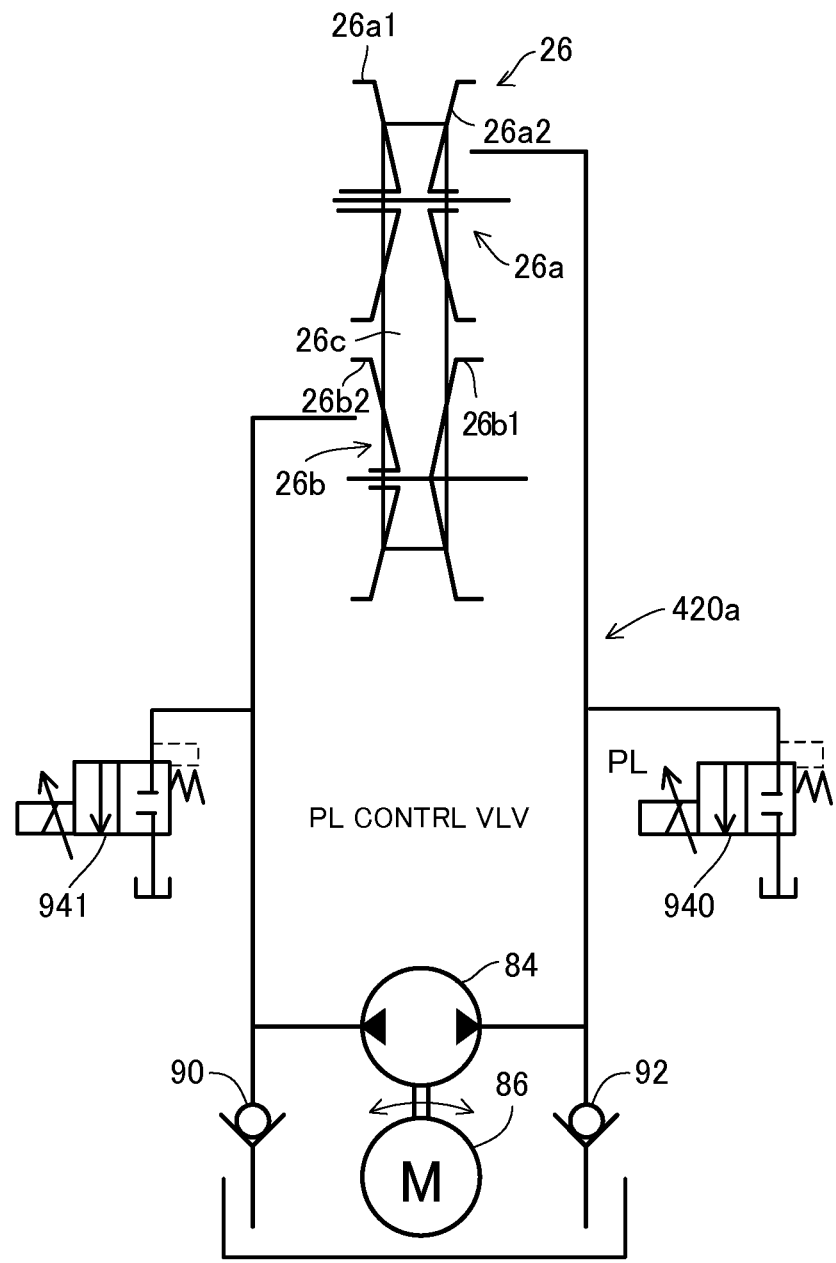
FIG. 8 is a hydraulic circuit diagram showing the configuration of a CVT hydraulic pressure supply mechanism of a hydraulic control apparatus of a continuously variable transmission according to a second embodiment of this invention.

FIG. 8 is a hydraulic circuit diagram similar to FIG. 2 of a CVT hydraulic pressure supply mechanism 420*a*, showing a second embodiment of the hydraulic control apparatus for a continuously variable transmission according to this invention.

Focusing the explanation on the points of difference from the first embodiment, in the second embodiment configuration, the control valve 94 is divided into two units as a first control valve 940 and a second control valve 941, and the first and second bypass passages 42*a*4, 42*a*5 and third and fourth check valves 96, 98 are eliminated.

This makes it possible to further simplify the structure, but in a situation where the ratio is fixed at LOW or OD by supplying hydraulic oil to one or the other of the drive pulleys 26*a*, 26*b*, when it is attempted to supply hydraulic oil to the other pulley, hydraulic oil discharges from the one pulley. Other aspects of the configuration and the effects are no different from those of the first embodiment.

As set out in the foregoing, the embodiment is configured to have an apparatus for controlling a continuously variable transmission (CVT 26) having a drive pulley (26*a*) connected to a prime mover (engine) 10 installed in a vehicle (14) and movable in an axial direction when hydraulic oil is supplied to a first hydraulic actuator (movable pulley half 26*a*2), a driven pulley (26*b*) connected to driven wheels (12) and movable in an axial direction when hydraulic oil is supplied to a second hydraulic actuator (movable pulley half 26*b*2), and a power transmissible element (26*c*) wound around the drive pulley and driven pulley and configured to vary a gear ratio continuously variable by controlling supply of hydraulic oil to the first and second actuators to vary the winding radius of the power transmissible element, comprising: first oil passage (42*a*1) that connects the first hydraulic actuator and a reservoir (82) for retaining hydraulic oil; a second oil passage (42*a*2) that connects the second hydraulic actuator and the reservoir; a single electric reversible hydraulic pump (84) installed at a common portion (42*a*3) of the first oil passage and the second oil passage and capable of pumping hydraulic oil retained in the reservoir and delivering to the first oil passage or the second oil passage; a first check valve (90) installed in the first oil passage between the reservoir and the hydraulic pump for blocking flow of hydraulic oil from the hydraulic pump to the reservoir; a second check valve (92) installed in the second oil passage between the reservoir and the hydraulic pump for blocking flow of hydraulic oil from the hydraulic pump to the reservoir; a first bypass passage (42*a*4) formed in the first oil passage between the hydraulic pump and the first hydraulic actuator; a second bypass passage (42*a*5) formed in the second oil passage between the hydraulic pump and the second hydraulic actuator; a control valve (94) installed between the first bypass passage and the second bypass passage and capable of varying the flow passage and pressure of hydraulic oil flowing through the first bypass passage and the second bypass passage; a third check valve (96) installed in the first bypass passage for blocking flow of hydraulic oil from the control valve to the hydraulic pump; a fourth check valve (98) installed in the second bypass passage for blocking flow of hydraulic oil from the control valve to the hydraulic pump; and a controller (80) for controlling operation of the hydraulic pump and the control valve, whereby a configuration that reduces the number of electric hydraulic pumps 84 to a single unit can be readily realized and cost increase can be minimized.

Moreover, the adoption of a configuration that controls operation of the hydraulic pump 84 by the controller (shift controller) 80 makes it possible to hold the rate of operation of the hydraulic pump 84 to the minimum necessary and thus conserve energy. Further, the configuration calls for the control valve 94 provided for varying hydraulic oil flow direction and pressure to be installed in the common portion of the first and second bypass passages and for its operation to be controlled by the controller, so that the configuration can be still further simplified because no additional switching valve is required on the drain side or elsewhere. Furthermore, the provision of the first to fourth check valves 90, 92, 96 and 98 enables reliable hydraulic oil retention.

Moreover, in the apparatus, the first bypass passage and the second bypass passage are configured to have a portion connecting the control valve (94) and the third check valve (96) and a portion connecting the control valve (94) and the fourth check valve (98) in common (as the oil passage 42a7), so that, in addition to realizing the foregoing effects, the structure of the control valve 94 can be simplified and oil passage increase can be prevented, thus enabling further structural simplification.

Further, in the apparatus, the controller (80) drives the hydraulic pump (84) to supply hydraulic oil from the first oil passage to the first hydraulic actuator, and controls operation of the control valve (94) to connect the second bypass passage to the reservoir to discharge hydraulic oil from the second hydraulic actuator, when the gear ratio is to be changed to a smallest value (OD) side, whereby, in addition to realizing the foregoing effects, the gear ratio can be reliably changed to the smallest value (OD) side merely by controlling the operation of the hydraulic pump 84 and control valve 94.

Furthermore, in the apparatus, the controller (80) drives the hydraulic pump (84) at a predetermined rotational speed to supply hydraulic oil of a prescribed high-pressure PH from the first oil passage to the first hydraulic actuator, and controls the operation of the control valve (94) to connect the second bypass passage to the reservoir to discharge hydraulic oil from the second hydraulic actuator in accordance with the desired gear ratio, when the gear ratio is to be changed to a smallest value (OD) side, whereby, in addition to realizing the foregoing effects, the hydraulic pump 84 supplies hydraulic oil directly to the pulley on the side that increases the winding radius R of the belt 26c, thus making the rotational speed (rotating speed) of the hydraulic Pump 84 the predominant factor determining the time required for shifting and making it possible to shorten the time needed for shifting.

Moreover, the structure enables pressure regulation of the pulley on the small winding radius R side opposite thereto by means of the control valve 94, which makes it possible to transmit the torque of the prime mover (engine) 10 to the driven wheels 12 without slipping.

Further, in the apparatus, the controller (80) drives the hydraulic pump (84) to supply hydraulic oil from the first oil passage to the first hydraulic actuator to establishes a smallest gear ratio, and then controls the operation of the control valve (84) to supply hydraulic oil from the first oil passage to the second hydraulic actuator through the third check valve, the second bypass passage and the second oil passage, when the gear ratio is to be fixed at the smallest value (OD), whereby, in addition to realizing the foregoing effects, the gear ratio can be reliably fixed at the smallest value (OD (HIGH)) merely by controlling the operation of the hydraulic pump 84 and control valve 94. In other words, the pressure of the hydraulic oil supplied to the first actuator and the pressure of the hydraulic oil supplied to the second actuator can be simultaneously regulated using a single hydraulic pump, so that the gear ratio can be reliably fixed at the smallest value (OD) with a simple configuration even in the case where hydraulic oil has to be supplied to the second actuator side.

Further, in the apparatus, the controller (80) drives the hydraulic pump (84) to supply hydraulic oil from the second oil passage to the second hydraulic actuator, and controls the operation of the control valve (94) to connect the first bypass passage to the reservoir to discharge hydraulic oil from the first hydraulic actuator, when the gear ratio is to be changed to the largest value (LOW) side, whereby, in addition to realizing the foregoing effects, the gear ratio can be reliably changed to the largest value (LOW) side merely by controlling the operation of the hydraulic pump 84 and control valve 94.

Furthermore, in the apparatus, the controller (80) drives the hydraulic pump (84) at a predetermined rotational speed to supply hydraulic oil of a prescribed high pressure from the second oil passage to the second hydraulic actuator, and controls the operation of the control valve (94) to connect the first bypass passage to the reservoir to discharge hydraulic oil from the first hydraulic actuator in accordance with the desired gear ratio, when the gear ratio is to be changed to the largest value (LOW) side, whereby, in addition to realizing the foregoing effects and similarly to in the case of changing the gear ratio to the smallest ratio side, the hydraulic pump 84 supplies hydraulic oil directly to the pulley on the side that increases the winding radius R of the belt 26c, whereby the time needed for shifting can be shortened.

Moreover, the structure enables pressure regulation of the pulley on the small winding radius R side opposite thereto by means of the control valve 94, which makes it possible to transmit the torque of the prime mover (engine) 10 to the driven wheels 12 without slipping.

Further, in the apparatus, the controller (80) drives the hydraulic pump (84) to supply hydraulic oil from the second oil passage to the second hydraulic actuator to establishes a largest gear ratio, and then controls the operation of the control valve (94) to supply hydraulic oil from the second oil passage to the first hydraulic actuator through the fourth check valve, the first bypass passage and the first oil passage, when the gear ratio is to be fixed at the largest value (LOW). whereby, in addition to realizing the foregoing effects, the gear ratio can be reliably fixed at the largest value (LOW) merely by controlling the operation of the hydraulic pump 84 and control valve 94. In other words, the pressure of the hydraulic oil supplied to the second actuator and the pressure of the hydraulic oil supplied to the first actuator can be simultaneously regulated using a single hydraulic pump 84, so that the gear ratio can be reliably fixed at the largest value (LOW) with a simple configuration even in the case where hydraulic oil has to be supplied to the first actuator side.

Furthermore, in the apparatus, a closed circuit is constituted by the first oil passage (42a1) connecting the first hydraulic actuator and the reservoir, the second oil passage (42a2) connecting the second hydraulic actuator and the reservoir, and the hydraulic pump (84) installed in the common portion (oil passage) (42a3) of the first oil passage and the second oil passage, whereby, in addition to realizing the foregoing effects, the rate of operation of the hydraulic pump can be reliably kept to the minimum necessary, thereby realizing still better energy conservation without affecting supply/discharge of hydraulic pressure to members other than the first and second hydraulic actuators, such as the torque converter 24 and forward clutch 30a.

While an engine is used as the prime mover in the foregoing, this is not a limitation. The prime mover can be an electric motor or a hybrid combination of an engine and an electric motor.

Although the foregoing embodiments is explained as using a belt as the power transmissible element wound around the drive pulley and driven pulley, the power transmissible element is not limited to a belt and can, for example, be a chain.

Moreover, the continuously variable transmission configuration shown in FIG. 1 is only an example and various modifications are possible. For example, the torque converter 24 can be eliminated or a starting clutch can be added.

INDUSTRIAL APPLICABILITY

In this invention, in a hydraulic control apparatus for a continuously variable transmission that enables gear ratio variation by controlling supply of hydraulic oil to first and second hydraulic actuators, there are provided with first and second oil passage connecting the first and second actuators to a reservoir, a single electric hydraulic pump installed at a common portion thereof, first and second check valves installed in the first and second oil passage for blocking flow of hydraulic oil to the reservoir, first and second bypass passages formed in the first and second oil passage, a control valve installed therebetween, a fourth check valve installed in the first and second bypass passages for blocking flow of hydraulic oil to the hydraulic pump, and a controller for controlling these, thus readily enabling a configuration that reduces the number of electric hydraulic pumps to one and minimizes cost increase.

DESCRIPTION OF SYMBOLS 10 engine (prime mover), 12 driven wheels, 14 vehicle, 16 DBW mechanism, 24 torque converter, 26 continuously variable transmission (CVT), 26a drive pulley, 26a2 movable pulley half (first hydraulic actuator), 26b driven pulley, 26b2 movable pulley half (second hydraulic actuator), 30 forward-reverse switching mechanism, 42 hydraulic pressure supply mechanism, 42a, 420a CVT hydraulic pressure supply mechanism, 42a1 first oil passage, 42a2 second oil passage, 42a3, 42a6, 42a7 common portion, 42a4 first bypass passage, 42a5 second bypass passage, 60 engine controller, 80 shift controller, 82 reservoir, 84 hydraulic pump, 86 electric motor, 90 first check valve, 92 second check valve, 94 control valve, 96 third check valve, 98 fourth check valve

The invention claimed is:
1. An apparatus for controlling a continuously variable transmission having a drive pulley connected to a prime mover installed in a vehicle and movable in an axial direction when hydraulic oil is supplied to a first hydraulic actuator, a driven pulley connected to driven wheels and movable in an axial direction when hydraulic oil is supplied to a second hydraulic actuator, and a power transmissible element wound around the drive pulley and driven pulley and configured to vary a gear ratio continuously variable by controlling supply of hydraulic oil to the first and second actuators to vary the winding radius of the power transmissible element, comprising:
   a first oil passage that connects the first hydraulic actuator and a reservoir for retaining hydraulic oil;
   a second oil passage that connects the second hydraulic actuator and the reservoir;
   a single electric reversible hydraulic pump installed at a common portion of the first oil passage and the second oil passage and capable of pumping hydraulic oil retained in the reservoir and delivering to the first oil passage or the second oil passage;
   a first check valve installed in the first oil passage between the reservoir and the hydraulic pump for blocking flow of hydraulic oil from the hydraulic pump to the reservoir;
   a second check valve installed in the second oil passage between the reservoir and the hydraulic pump for blocking flow of hydraulic oil from the hydraulic pump to the reservoir;
   a first bypass passage formed in the first oil passage between the hydraulic pump and the first hydraulic actuator;
   a second bypass passage formed in the second oil passage between the hydraulic pump and the second hydraulic actuator;
   a control valve installed between the first bypass passage and the second bypass passage and capable of varying the flow passage and pressure of hydraulic oil flowing through the first bypass passage and the second bypass passage;
   a third check valve installed in the first bypass passage for blocking flow of hydraulic oil from the control valve to the hydraulic pump;
   a fourth check valve installed in the second bypass passage for blocking flow of hydraulic oil from the control valve to the hydraulic pump; and
   a controller for controlling operation of the hydraulic pump and the control valve.

2. The apparatus according to claim 1, wherein the first bypass passage and the second bypass passage are configured to have a portion connecting the control valve and the third check valve and a portion connecting the control valve and the fourth check valve in common.

3. The apparatus according to claim 1, wherein the controller drives the hydraulic pump to supply hydraulic oil from the first oil passage to the first hydraulic actuator, and controls operation of the control valve to connect the second bypass passage to the reservoir to discharge hydraulic oil from the second hydraulic actuator, when the gear ratio is to be changed to a smallest value side.

4. The apparatus according to claim 3, wherein the controller drives the hydraulic pump at a predetermined rotational speed to supply hydraulic oil of a prescribed high-pressure from the first oil passage to the first hydraulic actuator, and controls the operation of the control valve to connect the second bypass passage to the reservoir to discharge hydraulic oil from the second hydraulic actuator in accordance with the desired gear ratio, when the gear ratio is to be changed to a smallest value side.

5. The apparatus according to claim 1, wherein the controller drives the hydraulic pump to supply hydraulic oil from the first oil passage to the first hydraulic actuator to establishes a smallest gear ratio, and then controls the operation of the control valve to supply hydraulic oil from the first oil passage to the second hydraulic actuator through the third check valve, the second bypass passage and the second oil passage, when the gear ratio is to be fixed at the smallest value.

6. The apparatus according to claim 1, wherein the controller drives the hydraulic pump to supply hydraulic oil from the second oil passage to the second hydraulic actuator, and controls the operation of the control valve to connect the first bypass passage to the reservoir to discharge hydraulic oil from the first hydraulic actuator, when the gear ratio is to be changed to the largest value side.

7. The apparatus according to claim 6, wherein the controller drives the hydraulic pump at a predetermined rotational speed to supply hydraulic oil of a prescribed high pressure from the second oil passage to the second hydraulic actuator, and controls the operation of the control valve to connect the first bypass passage to the reservoir to discharge hydraulic oil from the first hydraulic actuator in accordance with the desired gear ratio, when the gear ratio is to be changed to the largest value side.

8. The apparatus according to claim 1, wherein the controller drives the hydraulic pump to supply hydraulic oil from the second oil passage to the second hydraulic actuator to establishes a largest gear ratio, and then controls the operation of the control valve to supply hydraulic oil from the second oil passage to the first hydraulic actuator through the fourth check valve, the first bypass passage and the first oil passage, when the gear ratio is to be fixed at the largest value.

9. The apparatus according to claim 1, wherein a closed circuit is constituted by the first oil passage connecting the first hydraulic actuator and the reservoir, the second oil passage connecting the second hydraulic actuator and the reservoir, and the hydraulic pump installed in the common portion of the first oil passage and the second oil passage.

10. The apparatus according to claim 1, wherein the controller stops the hydraulic pump and puts the control valve in a neutral position in the steady state.

11. The apparatus according to claim 1, wherein the controller stops the hydraulic pump and puts the control valve in a neutral position when a desired gear ratio is established.

\* \* \* \* \*